Feb. 22, 1938.  E. S. KILLIAN  2,109,150
METHOD AND APPARATUS FOR HANDLING RUBBER ARTICLES
Filed Jan. 19, 1937
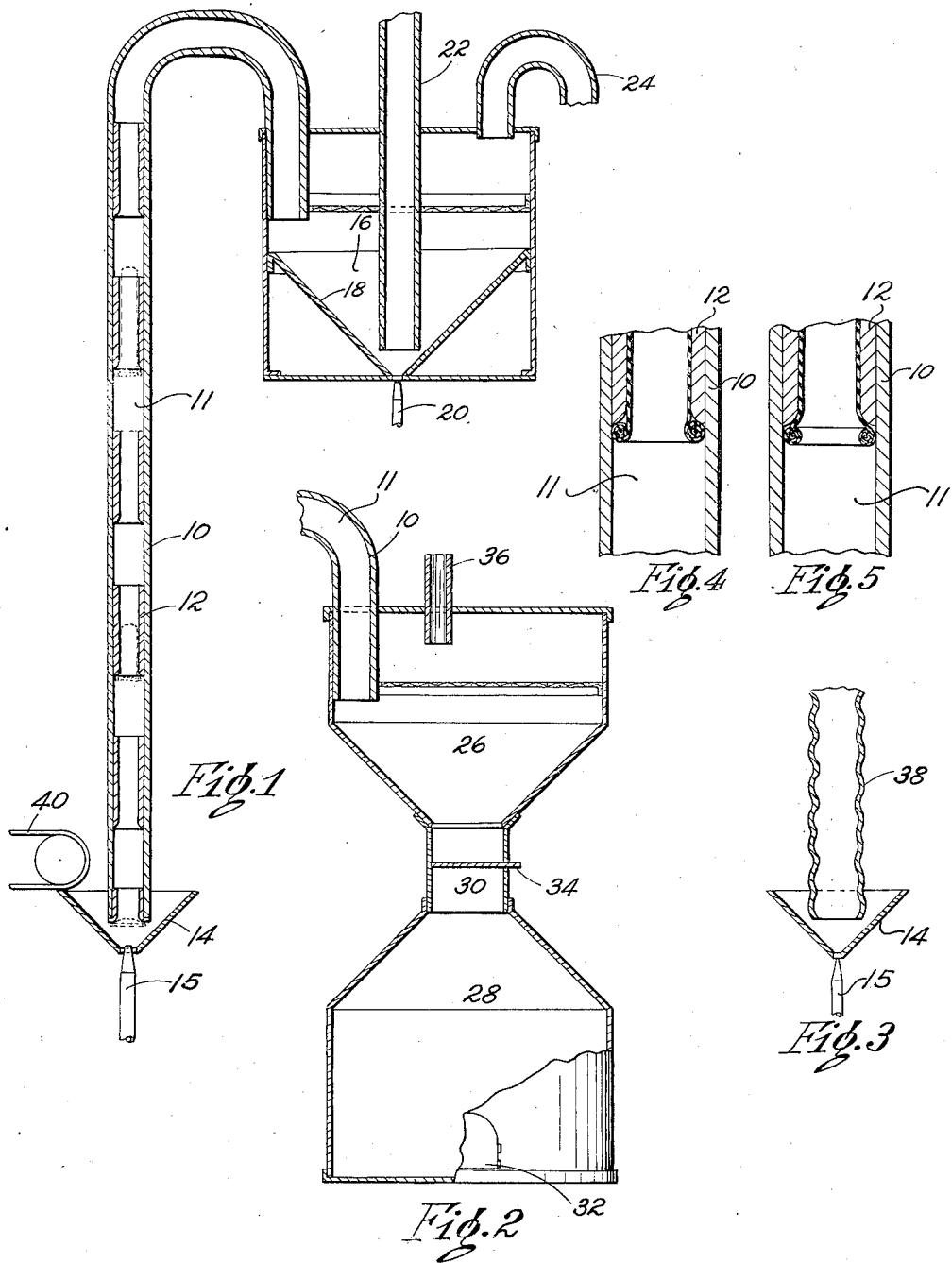
INVENTOR.
EDWARD S. KILLIAN
BY Richey + Watts
ATTORNEYS Patented Feb. 22, 1938

2,109,150

UNITED STATES PATENT OFFICE 2,109,150

METHOD AND APPARATUS FOR HANDLING RUBBER ARTICLES

Edward S. Killian, Akron, Ohio, assignor to Frank B. Killian, as trustee

Application January 19, 1937, Serial No. 121,303

10 Claims. (Cl. 223—1)

This invention relates to the art of manufacturing thin, dipped rubber articles and is particularly concerned with a new and improved method of and apparatus for unrolling tubular rubber articles which are closed at one end.

In the manufacture of thin, dipped, tubular rubber articles having one end closed, the cured articles are removed from their forms by being rolled off the forms. This operation rolls each article upon itself from the open end toward the closed end and thus each article as it comes from its form may be said to consist of a diaphragm of rubber surrounded by a ring of several rolls of thin rubber of the side wall of the article. The present invention is primarily concerned with the unrolling of such articles.

Previously the unrolling of thin, tubular rubber articles closed at one end was done manually, although various attempts have been made to do it by apparatus. The manual practice was expensive and slow. The various efforts to use apparatus have not been successful commercially because the apparatus provided did not completely unroll all the articles and more or less manual unrolling was required to complete the unrolling operation.

The present invention provides a method of and apparatus for unrolling thin, dipped rubber articles closed at one end with the cylindrical side walls thereof rolled upon themselves to a point adjacent the closed end wall which is extremely simple, inexpensive and successful. This invention is based on the discovery that, if rolled articles of the foregoing character as delivered from their forms, are moved through a tubular passage having a diameter slightly greater than the diameter of the articles, and preferably having portions of reduced diameter, by means of a swiftly moving stream of gas, the articles will be discharged from the tubular passage in a completely unrolled condition.

The foregoing and other advantages of the invention and the invention itself will become more apparent from the following detailed deescription taken in conjunction with the accompanying drawing wherein similar reference characters denote corresponding parts and wherein:—

Figure 1 is a vertical sectional view of a preferred form of apparatus for carrying out the present invention, Figure 2 is a vertical sectional view of apparatus which may be employed at the discharge end of the tubular passage in place of that shown in Figure 1, Figure 3 is a fragmentary sectional view of a modified form of apparatus for carrying out the invention, and Figures 4 and 5 are enlarged sectional views illustrating articles disposed within the tubular passage.

Figure 1 of the drawing, which illustrates one form of apparatus suitable for use in practicing the present invention, shows a vertically disposed, elongated, hollow tube 10 the inner walls of which define a passage 11 through which the articles move during the unrolling operation. Preferably the passage 11 has a diameter slightly greater than the article to be unrolled and also preferably has a plurality of constricted zones defined by projections extending inwardly from the inner wall of the tube which may be spaced throughout its length. These constricted zones may be provided by securing a plurality of sleeves 12 to the inside wall of the tube or reducing the inside diameter of the tube at spaced intervals along its length. In place of the tube 10, the corrugated tube 38 may be employed, as shown in Figure 3.

At the lower end of the tube 10 is positioned a conical shaped hopper 14, with downwardly converging walls, the hopper being preferably conical shaped with an opening at its apex through which projects a nozzle 15, which is connected to any suitable source of compressed gaseous fluid. The opening in the hopper through which the nozzle 15 extends is preferably of greater diameter than the diameter of the nozzle. The apex of the hopper 14 is aligned with the longitudinal axis of the tube 10, so that a stream of gaseous fluid projected from the nozzle 15 is introduced into and passes through the tube 10. The discharge end of the tube 10 opens into a chamber 16 having a conical shaped bottom, at the apex of which is disposed a nozzle 20. Aligned with the nozzle 20 is the open end of a delivery tube 22 through which the articles move to the succeeding manufacturing operation, in response to the stream of gas projected therethrough from the nozzle 20. If desired, the tube 22 may be provided with projections extending inwardly from the inner walls thereof similar to the projections 12 of tube 10. The chamber 18 is connected to any suitable type of dust collector (not shown) by means of the conduit 24.

In operation, an endless conveyor 40 is positioned to receive each article as it is removed from the form upon which it is made and to discharge the same into the hopper 14. The article slides down the inclined wall of the hopper until it is below the open end of the tube 10 where the stream of gas from the nozzle 15 engages the end wall diaphragm of the article and moves the article into and through the passage 11, defined by the inside walls of the tube 10. The articles enter the passage 11 and move swiftly therealong with the closed end walls of the articles in a position substantially at right angles to the longitudinal axis of the tube 10. The articles may be moved through the passage 11 in either one of two different positions, that is, with the rolled portion on the outside as shown in Figure 4, or with the rolled portion on the inside as shown in Figure 5. When the article enters the passage, as shown in Figure 4, the air or gas expands the article into contact with the walls of the passage which frictionally engage with the side walls and roll of the article. Such friction causes the roll to unroll as the article moves along the passage. Similarly additional unrolling is occasioned by the frictional contact of the rolled up portion of the article with the side walls of the passage at the constricted areas. If the article enters the passage in the position shown in Figure 5, the air which impinges against the diaphragm first expands the article into contact with the walls of the passage and then is deflected along the sides of the article and strikes above the roll on the way out of the article, thus unrolling the roll. In both instances, constrictions in the passage are thought to act as the means which impede uniform speed of the article through the passage and to cause it to slow down, or stop momentarily at each restriction, whereupon the gas flow stretches the unrolled part of the article and again moves the article forward with some unrolling at each stretching.

Substantially all of the articles when they are discharged from the tube 10 into the chamber 16 are completely unrolled. The conical bottom of the chamber 16 brings the article into registry with the open end of the delivery tube 22, through which a swiftly moving stream of gas is passing. This stream picks up the articles and propels them through the tube 22 and delivers them to the desired place for subsequent manufacturing operations. Where the tube 22 is provided with inwardly extending projections, such of the articles which were not unrolled or were only partially unrolled when discharged from tube 10 are subjected to a second unrolling action in passing through tube 22 which insures that all the articles are completely unrolled when discharged from the tube 22.

Apparatus including a tube having a passage throughout of approximately 2 inches in diameter and about 10 feet in length with spaced constricted zones about 6 inches in length and 1 and ½ inches in diameter has been successfully used to unroll the articles. However, it has been found that the passage can be considerably less or greater than ten feet in length and that a plurality of successive passages may be employed dependent upon the character of the article which is being unrolled.

In Figure 2 there is illustrated apparatus which may be substituted for the apparatus employed at the discharge end of the tube 10 in Figure 1. When such substitution is made, the nozzle 15 associated with the hopper 14 is not used. With reference to Figure 2, the discharge end of the tube 10 opens into a substantially air tight chamber 26, which is connected to a storage chamber 28 disposed therebelow by means of a passage 30. The chamber 26 has a conical shaped bottom so that when articles are discharged into this chamber, they move downwardly by gravity through the passage 30 and collect within chamber 28 from which they may be removed through the opening 32. A slide valve 34 is provided in the passage 30 so that the chamber 26 may be closed off from chamber 28 when articles are being removed from the latter. The conduit 36 connects the chamber 26 with any suitable type of evacuator (not shown) for causing a stream of gas to be drawn through the passage 11.

When the apparatus shown in Figure 2 is employed in conjunction with the tube 10, the articles are drawn through the tube 10 in response to the movement of gas therethrough caused by the exhaustion of the gas within the chamber 26. When this type of apparatus is employed, unrolling of the article moving through the tube 10 is effected in the same manner as described hereinabove with respect to Figure 1. The gas or air being drawn through the passage 11 acts on the end wall or diaphragm of the article, stretching the same and pulling the article along the passage, the roll thereof frictionally engaging the wall of the passage as it moves therealong. The constricted portions of the tube increase the frictional contact of the roll with the inner wall of the passage which retards uniform or free movement of the article through the passage. This momentary retarding of the movement of the article increases the force of the air on the diaphragm thereby further stretching the same which stretching causes unrolling of the article.

When the articles have been discharged into the chamber 26, they readily fall down through the passage 30 into the collecting chamber 28. In order to avoid shutting down the operation of the apparatus when it is desired to remove the articles collected within the chamber 28, it is only necessary to close the slide valve 34 across the passage 30. The articles are collected within the chamber 26 while removal of the articles in chamber 28 is being done. In this manner the apparatus can be operated continuously.

Having thus described my invention, what I desire to secure by Letters Patent is defined in what is claimed.

I claim:

1. The method of unrolling a thin, tubular, rubber article, closed at one end, with the cylindrical side wall thereof rolled upon itself to a point adjacent the closed end wall, which includes the steps of creating a swiftly moving stream of gaseous fluid through a passage, bringing the rolled article into said stream in such a manner that the stream will move the article along the passage, and unrolling the article by subjecting it to the action of said stream and to frictional contact with the walls of the passage as it moves along the passage.

2. The method of unrolling a thin, tubular, rubber article, closed at one end, with the cylindrical side wall thereof rolled upon itself to a point adjacent the closed end wall, which includes the steps of creating a swiftly moving stream of gaseous fluid through a passage, bringing the rolled article into said stream in such a manner that the stream will move the article along the passage, and unrolling the article by moving it swiftly along the passage with the axis of the article substantially coincident with the longitudinal axis of the passage and with the periphery of the article engaging restrictions in said passage.

3. The method of unrolling a thin, tubular, rubber article, closed at one end, with the cylindrical side wall thereof rolled upon itself to a point adjacent the closed end wall, which includes the steps of directing a stream of gaseous fluid under pressure into one end of a passage, bringing the rolled article into said stream in such a manner that the stream will push the article along the passage, and unrolling the article by subjecting it to the impelling action of said stream and to frictional contact with the walls of the passage as it moves along the passage.

4. The method of unrolling a thin, tubular, rubber article, closed at one end, with the cylindrical side wall thereof rolled upon itself to a point adjacent the closed end wall, which includes the steps of applying suction to one end of a passage to cause a flow of gaseous fluid therethrough, bringing the rolled article into said stream in such a manner that the stream will draw the article along the passage, and unrolling the article by subjecting it to the action of said stream and to frictional contact with the walls of the passage as it moves along the passage.

5. The method of unrolling a thin, tubular, rubber article, closed at one end, with the cylindrical side wall thereof rolled upon itself to a point adjacent the closed end wall, which includes the steps of creating a swiftly moving stream of gas through a passage having portions the diameter of which is approximately the outside diameter of the article, bringing the rolled article into said stream in such a manner that the stream will move the article along the passage, and unrolling the article by subjecting it to the action of said stream and to frictional contact with the walls of the passage as it moves along the passage.

6. The method of unrolling a thin, tubular, rubber article, closed at one end, with the cylindrical side wall thereof rolled upon itself to a point adjacent the closed end wall, which includes the steps of projecting a swiftly moving stream of gas into the open end of a tubular passage slightly larger in inside diameter than the diameter of the article, bringing the rolled article into registry with the open end of the passage and subjecting it to the impelling action of said stream of gas, unrolling the article by frictionally engaging the rolled part of the article with the side walls of the passage as the article moves swiftly along the passage, and intermittently reducing the over all diameter of the articles by moving the articles through zones within the passage having a diameter slightly smaller than the rolled portion of the article.

7. The method of unrolling a thin, tubular, rubber article, closed at one end, with the cylindrical side wall thereof rolled upon itself to a point adjacent the closed end wall, which includes the steps of creating a swiftly moving stream of gas in a passage slightly larger in inside diameter than the diameter of the article and having an uneven inner surface, bringing the rolled article into the passage and subjecting it to the impelling action of said stream of gas, unrolling the article by frictionally engaging the rolled part of the article with the side walls of the passage as the article moves swiftly along the passage, and increasing the frictional engagement of the rolled portion of the article with the side walls of the passage by causing the article to move through zones within the passage of smaller diameter than the diameter of the rolled portion of the article.

8. Apparatus of the class described comprising a hopper having downwardly converging side walls, a tube having one end positioned closely adjacent to the bottom of said hopper and having therewith in axially short tubular projections concentric with and spaced apart axially along said tube, and means, including a nozzle aligned with the opening in the hopper and in said tube to project a stream of gaseous fluid into the tube, for moving from the hopper and into and through said tube, a thin, tubular, rubber article of slightly smaller diameter than said tube and closed at one end with the cylindrical side wall thereof rolled upon itself to a point adjacent the closed end wall and with the end wall of the article extending crosswise of the tube.

9. Apparatus of the class described comprising a hopper having downwardly converging side walls, a tube having one end positioned closely adjacent to the bottom of said hopper and means, including an evacuator operatively associated with the discharge end of said tube to create a swiftly moving stream of gaseous fluid under pressure through said tube for moving from the hopper and into and through said tube, a thin, tubular, rubber article closed at one end, with the cylindrical side wall thereof rolled upon itself to a point adjacent the closed end wall and with the rolled portion of the article in frictional engagement with the inner surface of the said tube.

10. Apparatus, for unrolling thin, tubular rubber articles, each having an end wall and cylindrical side wall rolled upon itself to a point adjacent to said end wall, comprising a hopper, to receive such rubber articles, having downwardly converging side walls and a bottom wall having an opening therethrough, an upright tube in line with said bottom opening having an inside diameter approximating the outside diameter of said articles and having its lower end spaced from the side and bottom walls of said hopper, and means, including a nozzle alined with said hopper opening and said tube, for creating a swiftly moving flow of gaseous fluid through said tube to move said unrolled articles from the hopper into the said tube and unroll them therein while they are passing therethrough with the closed ends extending across the tube and the side walls frictionally engaging the inner surface of said tube.

EDWARD S. KILLIAN.